C. Pope,

Hames,

N° 6,850.   Patented Nov. 6, 1849.

UNITED STATES PATENT OFFICE.

CHARLES POPE, OF SYRACUSE, NEW YORK.

HARNESS-HAME.

Specification of Letters Patent No. 6,850, dated November 6, 1849.

*To all whom it may concern:*

Be it known that I, CHAS. POPE, of Syracuse, in the county of Onondaga and State of New York, have invented a new and useful Improvement in Harness-Hames; and I do hereby declare the following to be a full and exact description thereof, reference being had to the accompanying drawings, making a part of this specification.

Figure 3:
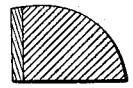

The form given to harness hames in their cross section, as they have heretofore been made, is represented by Figure 3, of the accompanying drawings, the inner edge of each portion of the hame being of an oval form. Hames have also, sometimes been made of an angular form, with their inner edges perfectly flat.

Figure 1:
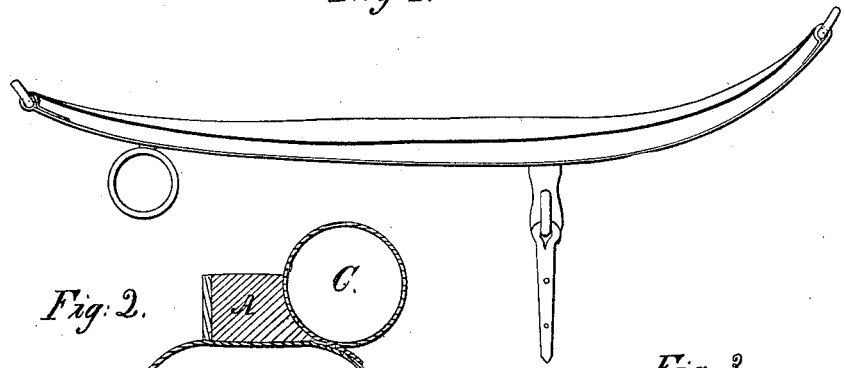
Figure 2:
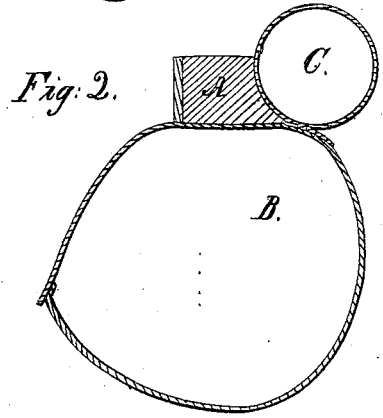

My improvement consists in giving the inner edge of the hame (A,) a concave shape, which concavity, (in the edge of the hame) corresponds with and fits accurately to the roll (C) upon the collar; (B,) as represented in Fig. 2, of the accompanying drawings. This improvement in the form of the hame enables it to be fitted much more closely and accurately to the collar than the old form of hame can be made to fit, and consequently, renders it much less liable to displacement, from the action of the hold back straps.

The jerks imparted to the hold back straps by the passage of a carriage through depressions in a road, not infrequently draw the hames forward over the roll C, and detach them from the collar; requiring the carriage to be stopped to replace the hames in their proper positions upon the collar.

What I claim as my invention and desire to secure by Letters Patent, is—

The giving the inner edges of harness hames a concave form for the purpose of enabling them to be fitted with much greater accuracy to the roll upon the collar, and thereby securing them against displacement, substantially as herein set forth.

The above specification signed and witnessed this first day of September 1849.

CHAS. POPE.

Witnesses:
C. H. STOUGHTON,
E. S. DAWSON.